UNITED STATES PATENT OFFICE.

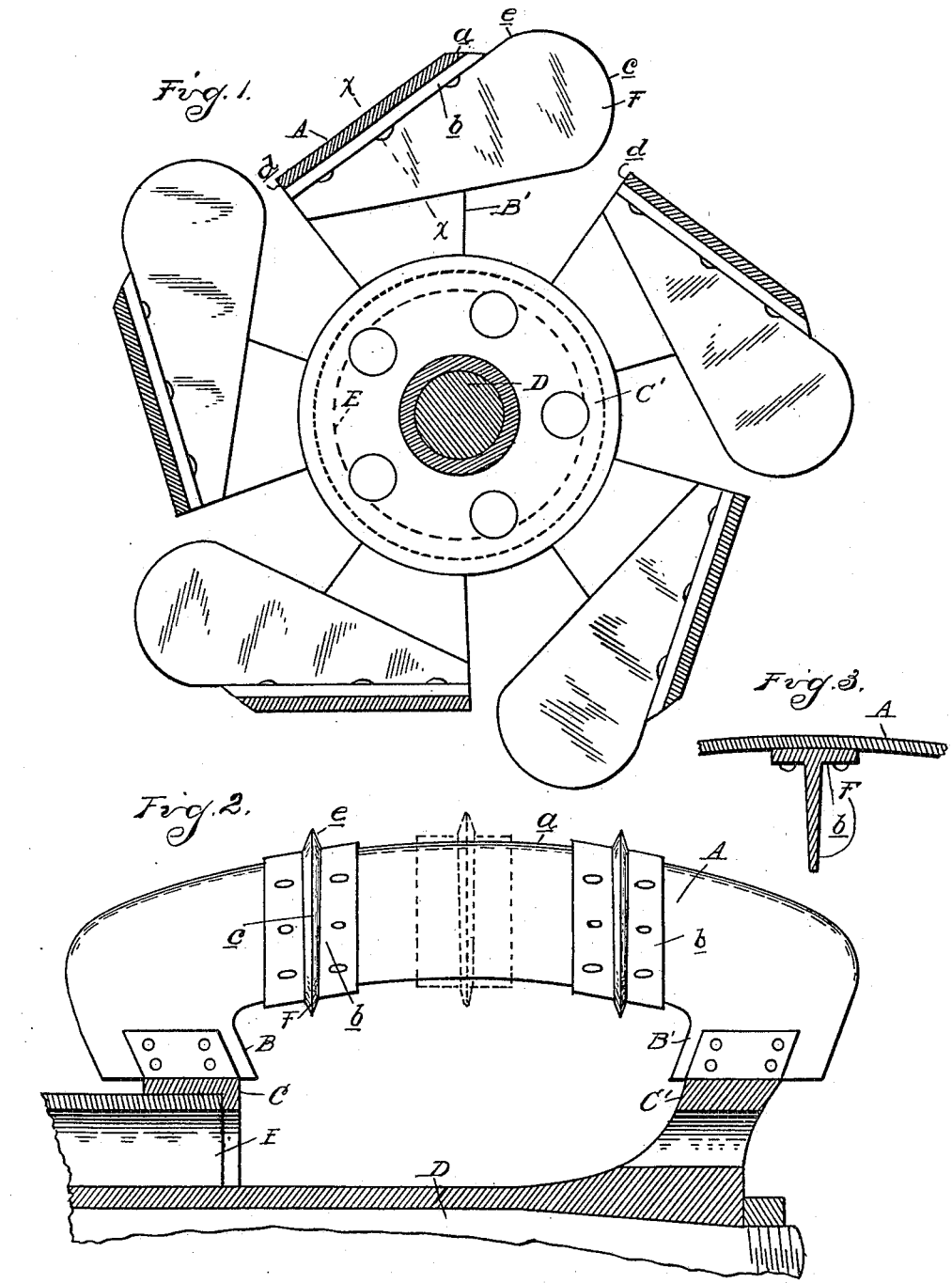

JOHN BURKE CANTWELL, OF WATERTOWN, NEW YORK.

EXCAVATING-CUTTER.

No. 819,723.  Specification of Letters Patent.  Patented May 8, 1906.

Application filed March 8, 1905. Serial No. 249,032.

*To all whom it may concern:*

Be it known that I, JOHN BURKE CANTWELL, a citizen of the United States, residing at Watertown, in the county of Jefferson and State of New York, have invented certain new and useful Improvements in Excavating-Cutters, of which the following is a specification, reference being had therein to the accompanying drawings.

The invention relates to excavating apparatus, and has more particular reference to the construction of rotary cutter which subdivides the soil preparatory to its removal by suction or other suitable means.

The invention consists in the peculiar construction and arrangement of the cutter-blades, as hereinafter set forth.

In the drawings, Figure 1 is a cross-section through the rotary cutter. Fig. 2 is an elevation of one of the cutter-blades, and Fig. 3 is a cross-section on line $x\,x$ of Fig. 1.

As shown, the rotary cutter is designed to be arranged at the end of a suction-pipe through which a current of water is drawn, carrying the material severed by the cutter. Where the excavator is working in clay or relatively hard soil, it is desirable that it should be subdivided into comparatively small pieces to prevent the clogging of the suction-pipe. To this end the rotary cutter is provided not only with longitudinally-extending severing-blades, but also cross-cutters which subdivide the strips severed by the longitudinal blades.

In detail, A represents the longitudinal cutter-blades, which are preferably of segmental form and at their opposite ends are bent to form radially-extending portions B and B′, which latter are attached to suitable heads C and C′ upon a rotary shaft D. This shaft, as shown, passes axially through the suction-pipe E, through which the material severed is carried away. The blades A are spaced around the rotary heads C and C′ and are inclined to the radial lines of said head, so as to form a favorable angle for cutting. Thus the forward sharpened edge $a$ will in the rotation of the heads sever strips from the soil, which are deflected inward and into the space inclosed by the blades and into direct connection with the suction-pipe. These strips severed by the blades A are further subdivided by cross-cutters F of the following construction: The cutters F are designed to subdivide the strips severed by the blades A without materially increasing the resistance to the movement of the cutter through the soil. Inasmuch as the resistance to the cutter increases in proportion to the distance of the cutting edge from the axis of rotation it is desirable to place the cross-cutters F as near as possible to said axis of rotation and at the same time to be in a position to subdivide the strips severed by the blades A. This is accomplished by securing the blades F to the inner sides of the blades A, and, as shown, each cutter F is provided with laterally-extending wings or securing-flanges $b$, which are riveted or otherwise secured to the blades A. The forward ends of the blades F preferably project slightly in advance of the edges $a$ of the blades A, so that the soil will be slitted in advance of the severing by the blades A. As shown, these forward edges $c$ are rounded in the plane of the blade and extend from the cutting edge $a$ of the blade A into proximity to the rear edge $d$ of the next adjacent blade A. From their forward portions the blades F taper rearwardly, preferably extending to the rear edge $d$ of the blades A. The forward edges of the wings $b$ also preferably extend slightly in advance of the cutting edge $a$ of the blades A and are sharpened to form cutting edges $e$.

With the construction as shown, in operation the rotation of the shaft D and heads C C′ simultaneously with the pressing of the cutter into the soil will cause the cutting edges $c$ of the blades F to slit the surface of the soil, which is then severed into strips by the blades A, and the portions of the strips between the heads and cross-cutters F are directed inward into the path of the water current drawn through the suction-pipe E. By reason of the tapering shape of the blades F considerable free space is provided within the cutter for carrying away the material, and at the same time these tapering portions reinforce the forward cutting edges $c$ of the blades F. The cutting edges $c$ and $e$ at the forward edge of the cross-cutters F extend to slightly beyond the circular path of the cutting edges $a$, so that the resistance to the rotation of the cutter is not materially increased by these cross-cutters.

What I claim as my invention is—

1. The combination with a rotating cutter-blade extending substantially parallel to the axis of rotation, of a cross-cutting blade secured to the aforesaid blade, whereby the material is slit by said cross-cutting blade and subsequently in the same stroke severed by said longitudinal blade.

2. The combination with a rotary cutting-blade, extending substantially parallel to the axis of rotation, of a cross-cutting blade secured to the aforesaid blade and extending inwardly therefrom.

3. The combination with a rotary cutting-blade, extending substantially parallel to the axis of rotation, of a blade extending transverse to the axis of rotation, and inwardly from the cutting edge of said longitudinal blade.

4. The combination with a series of rotating blades arranged to extend substantially parallel to a common axis of rotation and inclining inward therefrom, cutting edges of a cross-cutting blade extending from the cutting edge of one of said longitudinal blades into proximity to the rear edge of an adjacent longitudinal blade.

5. The combination with a series of rotating blades extending substantially parallel to a common axis of rotation and spaced about said axis, of a cross-cutting blade for each of said longitudinal blades, extending inward therefrom, and arranged to slit the soil in advance of severance by the longitudinal blade, the cross-cutters of adjacent longitudinal blades being arranged in different orbits of rotation.

6. The combination with a series of rotating cutting-blades, spaced around a common axis of rotation, and extending substantially parallel therewith, of a cross-cutter for each blade arranged in a plane transverse to the axis and extending inward from the cutting edge of the longitudinal blade at its forward cutting edge, and tapering toward the rear end of said longitudinal blade.

7. The combination of the rotary longitudinal cutter A, of the cross-cutter F secured to the inner side of said blade by lateral wings or securing-flanges $b$, having the curved cutting edge $c$, and the tapering rearward portion, for the purpose described.

8. The combination with a rotating cutter-blade extending substantially longitudinally of the axis of rotation, of a cutting-blade secured to the aforesaid blade at an angle thereto, so positioned that their combined action in the same cutting stroke severs strips of material of lesser length than said longitudinal blade.

9. The combination with a rotating cutter-blade extending substantially longitudinally of the axis of rotation, of means secured to said blade whereby the material is subdivided before being severed by said blade in the same stroke.

In testimony whereof I affix my signature in presence of two witnesses.

JOHN BURKE CANTWELL.

Witnesses
C. O. HERVEY,
THEO. A. JAEGER.